(No Model.)
A. WOLF.
SIFTER FOR FLOUR, &c.
No. 319,375. Patented June 2, 1885.
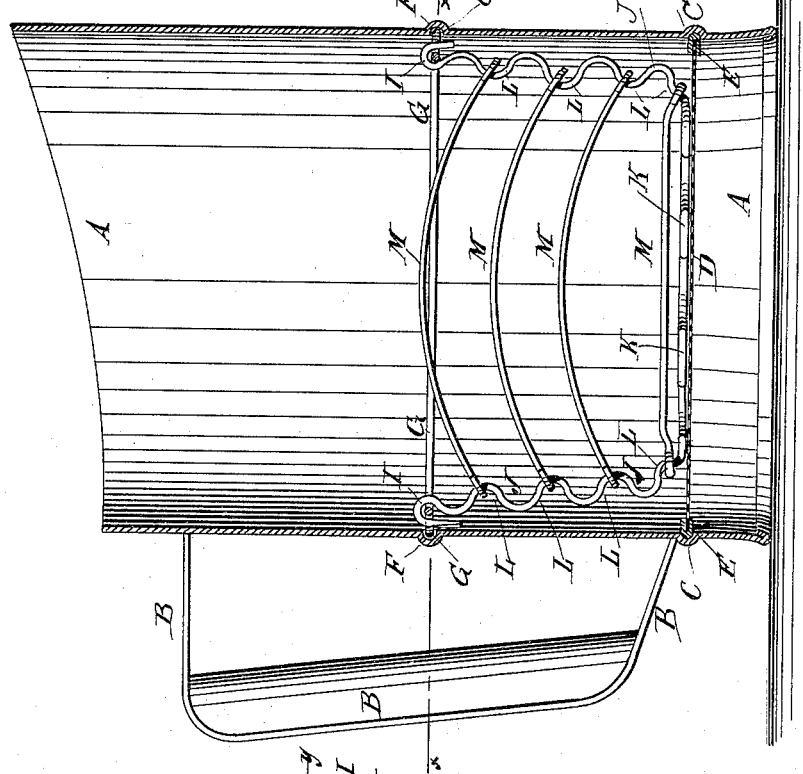
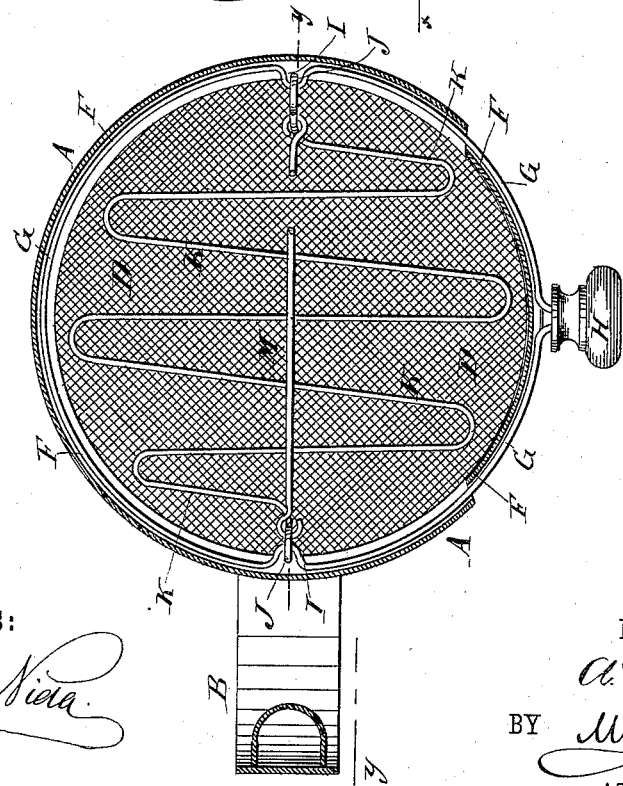
WITNESSES:
INVENTOR:
A. Wolf
BY Munn & Co.
ATTORNEYS.

UNITED STATES PATENT OFFICE.

ABRAHAM WOLF, OF NEW YORK, N. Y.

SIFTER FOR FLOUR, &c.

SPECIFICATION forming part of Letters Patent No. 319,375, dated June 2, 1885.

Application filed April 1, 1885. (No model.)

*To all whom it may concern:*

Be it known that I, ABRAHAM WOLF, of the city, county, and State of New York, have invented a new and useful Improvement in Sifters for Flour and Other Substances, of which the following is a full, clear, and exact description.

Reference is to be had to the accompanying drawings, forming a part of this specification, in which similar letters of reference indicate corresponding parts in both the figures.

Figure 1 is a sectional plan view of one of my improved sifters, taken through the line *x x*, Fig. 2. Fig. 2 is a sectional side elevation of the same, taken through the line *y y*, Fig. 1.

The object of this invention is to provide sifters constructed in such a manner that flour and other substances can be easily and quickly sifted, and which shall be simple in construction, convenient in use, and effective in operation.

The invention relates to a sifter constructed with a scoop provided with a sieve and having an annular groove, partly interior and partly exterior, to receive a wire ring having an exterior handle and interior eyes, with which engage hooks formed upon upright wires, having at their lower ends horizontal loops, and provided with recesses to receive eyes formed upon the ends of cross-wires, whereby the substance placed in the scoop can be readily sifted and the stirrer can be readily attached and detached, as will be hereinafter fully described and then claimed.

A represents a cylindrical vessel, of sheet metal or other suitable material, open at top and bottom and provided at one side with a handle, B. The lower edge of the vessel A is folded in upon itself to strengthen and stiffen it. The upper edge of the vessel A is beveled, as shown in Fig. 2, to adapt the said vessel to serve as a scoop for taking up the flour or other substance to be sifted.

In the inner surface of the vessel or scoop A, at a little distance from its lower edge, is formed an annular groove, C, in which is inserted the edge of a circular sieve, D. The edge of the sieve D is bound with sheet metal E, to strengthen it and adapt it to retain its place in the groove C.

In the middle part of the scoop A is formed an annular groove, F, about three-fourths of which is in the inner surface of the said scoop and the remainder in the outer surface, as shown in Fig. 1.

In the groove F is placed a wire ring, G, which passes through holes in the side of the scoop A at the points where the interior and exterior parts of the said groove meet.

To the part of the wire ring G in the exterior portion of the groove F is attached a knob or handle, H, by means of which a vibratory movement is given to the said ring G.

In the opposite parts of the wire ring G, at the distance of a quarter of a circle from the handle H, are formed two eyes, I, into which are hooked hooks formed upon the ends of the wire uprights J, the lower ends of which are formed in one piece with the looped or zigzag wire K, resting upon or close to the sieve D, so as to serve as a rubber, when vibrated, to rub the flour or other material through the said sieve D.

Upon the wire uprights J are formed a number of inward bends or recesses, L, in which rest the eyes of the cross-wires M, which serve as braces to keep the uprights J in place, and as stirrers to keep the material being sifted loose. The lower cross-wire M is placed close to the looped wire K to keep the loops of the said wire from spreading or contracting. The cross-wires M may be straight, or they may be slightly curved or arched, as shown in Fig. 2.

The eyes of the cross-wires M can be closed upon the recesses of the uprights J by a blow with a hammer or by other suitable means, and can be further secured by tinning the stirrer after the wires J K M have been put together.

The hooks upon the ends of the wires J are so formed that they can be readily raised out of the eyes I of the ring G and again inserted therein, so that the stirrer J K M can be readily detached when desired.

In using the sifter, the scoop A is held by one hand and the stirrer is operated by vibrating the handle H with the other hand, which causes the looped wire K to rub the flour or other material through the sieve D.

Having thus fully described my invention,

I claim as new and desire to secure by Letters Patent—

1. In a sifter, the combination, with the scoop A, provided with a sieve, D, and having annular groove F, partly interior and partly exterior, of the wire ring G, having exterior handle, H, and interior eyes, I, and the stirrer J K M, substantially as herein shown and described, whereby a substance placed in the said scoop can be readily sifted, as set forth.

2. In a sifter, the stirrer, made substantially as herein shown and described, and consisting of the uprights J, having hooks upon their upper ends and provided with recesses L, the looped wire K, formed upon the said uprights, and the cross-wires M, secured to the uprights, whereby the stirrer can be readily attached and detached, as set forth.

ABRAHAM WOLF.

Witnesses:
JAMES T. GRAHAM,
C. SEDGWICK.